United States Patent
Wei et al.

(10) Patent No.: US 12,094,185 B2
(45) Date of Patent: Sep. 17, 2024

(54) VIDEO FRAME ANALYSIS FOR TARGETED VIDEO BROWSING

(71) Applicant: CITRIX SYSTEMS, INC., Fort Lauderdale, FL (US)

(72) Inventors: Daowen Wei, Nanjing (CN); Hengbo Wang, Nanjing (CN); Jian Ding, Nanjing (CN); Feng Tao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/578,084

(22) Filed: Jan. 18, 2022

(65) Prior Publication Data

US 2023/0196724 A1    Jun. 22, 2023

Related U.S. Application Data

(63) Continuation of application No. PCT/CN2021/139533, filed on Dec. 20, 2021.

(51) Int. Cl.
| | |
|---|---|
| G06V 10/74 | (2022.01) |
| G06T 7/194 | (2017.01) |
| G06V 10/28 | (2022.01) |
| G06V 20/40 | (2022.01) |
| G11B 27/00 | (2006.01) |
| G11B 27/34 | (2006.01) |
| H04N 5/14 | (2006.01) |

(52) U.S. Cl.
CPC ............ *G06V 10/761* (2022.01); *G06T 7/194* (2017.01); *G06V 10/28* (2022.01); *G06V 20/46* (2022.01); *G06V 20/48* (2022.01); *G11B 27/005* (2013.01); *G11B 27/34* (2013.01); *H04N 5/147* (2013.01); *G06T 2207/10016* (2013.01)

(58) Field of Classification Search
CPC ...... G06V 10/761; G06V 10/28; G06V 20/46; G06V 20/48; G06T 7/194; G06T 2207/10016; G11B 27/005; G11B 27/34; H04N 5/147
See application file for complete search history.

(56) References Cited

U.S. PATENT DOCUMENTS

| | | | | |
|---|---|---|---|---|
| 2003/0020743 | A1* | 1/2003 | Barbieri | G11B 27/105 |
| 2005/0078868 | A1* | 4/2005 | Chen | G06F 16/739 |
| | | | | 345/428 |
| 2009/0132510 | A1* | 5/2009 | Dimitrova | G06F 16/739 |
| | | | | 707/999.005 |
| 2017/0040040 | A1* | 2/2017 | Ikeda | G06F 18/22 |
| 2018/0268556 | A1* | 9/2018 | Karavadi | G06T 7/277 |

* cited by examiner

*Primary Examiner* — Girumsew Wendmagegn

(57) ABSTRACT

A method for video frame analysis includes determining a first dissimilarity metric and a second dissimilarity metric. The first dissimilarity metric may correspond to a first difference between a first foreground of a first key frame in a video and a second foreground of a second key frame following the first key frame in the video. The second dissimilarity metric may correspond to a second difference between the second foreground of the second key frame and a third foreground of a third key frame following the second key frame in the video. A playback of the video may be generated based on the first dissimilarity metric and the second dissimilarity metric. Related systems and computer program products are also provided.

20 Claims, 8 Drawing Sheets

VIDEO FRAME ANALYSIS FOR TARGETED VIDEO BROWSING

CROSS REFERENCE TO RELATED APPLICATIONS

This application is a Bypass Continuation Application of International Application No. PCT/CN2021/139533, filed Dec. 20, 2021 and entitled "VIDEO FRAME ANALYSIS FOR TARGETED VIDEO BROWSING," the disclosure of which is incorporated herein by reference in its entirety.

TECHNICAL FIELD

The subject matter described herein relates generally to video processing and more specifically to video frame analysis for targeted video browsing.

BACKGROUND

Modern mobile devices, such as smartphones and tablet computers, may include at least one camera and are thus capable of capturing digital still images and videos. A mobile device equipped with a camera may include one or more applications that enable a user to operate the camera including, for example, to activate the camera to capture a still image or an video. To expedite access to the camera, the mobile device may also include a physical button for activating the camera. Furthermore, the mobile device may include one or more applications for editing and sharing the still images and videos captured by the mobile device.

SUMMARY

Methods, systems, and articles of manufacture, including computer program products, are provided for video frame analysis. In one aspect, there is provided a system including at least one data processor and at least one memory. The at least one memory may store instructions, which when executed by the at least one data processor, cause the at least one data processor to at least: determine a first dissimilarity metric corresponding to a first difference between a first key frame in a video and a second key frame following the first key frame in the video; determine a second dissimilarity metric corresponding to a second difference between the second key frame and a third key frame following the second key frame in the video; and generate, based at least on the first dissimilarity metric and the second dissimilarity metric, a playback of the video.

In some variations, one or more of the features disclosed herein including the following features can optionally be included in any feasible combination. The first dissimilarity metric may be determined based on a first similarity metric between the first key frame and the second key frame. The second dissimilarity metric may be determined based on a second similarity metric between the second key frame and the third key frame.

In some variations, the first similarity metric and the second similarity metric include one or more of a Minkowski distance, a Manhattan distance, a Euclidean distance, or a Hausdorff distance.

In some variations, the first dissimilarity metric may correspond to the first difference between a first foreground of the first key frame and a second foreground of the second key frame. The second dissimilarity metric may correspond to the second difference between the second foreground of the second key frame and a third foreground of the third key frame.

In some variations, the at least one data processor may be further caused to at least: apply a foreground segmentation technique to detect one or more of the first foreground, the second foreground, or the third foreground.

In some variations, the foreground segmentation technique may include one or more of a frame differencing, a mean filter, a running Gaussian average, a background mixture model, a subspace learning, a robust principal component analysis (RPCA), a decomposition into low-rank plus additive matrices, or a neural network.

In some variations, the at least one data processor may be further caused to at least: binarize the first foreground, the second foreground, and/or the third foreground such that the first dissimilarity metric is computed based on the binarized first foreground and the binarized second foreground and the second dissimilarity metric is computed based on the binarized second foreground and the binarized third foreground.

In some variations, the playback of the video may include displaying a visual representation of the first dissimilarity metric and the second dissimilarity metric.

In some variations, the playback of the video may include playing the video at a first playback speed corresponding to the first dissimilarity metric and playing the video at a second playback speed corresponding to the second dissimilarity metric.

In some variations, the playback of the video may skip over one or more key frames associated with a below-threshold dissimilarity metric.

In some variations, the at least one data processor may be further caused to at least: record the first dissimilarity metric and the second dissimilarity metric, the first dissimilarity metric being associated with the second key frame and/or a first timestamp of the second key frame, and the second dissimilarity metric being associated with the third key frame and/or a second timestamp of the third key frame.

In some variations, the at least one data processor may be further caused to at least: identify the first key frame, the second key frame, and the third key frame such that a dissimilarity metric is computed for each pair of key frames included in the video but not for one or more inter-frames interspersed between successive key frames.

In another aspect, there is provided a method for video frame analysis. The method may include: determining a first dissimilarity metric corresponding to a first difference between a first key frame in a video and a second key frame following the first key frame in the video; determining a second dissimilarity metric corresponding to a second difference between the second key frame and a third key frame following the second key frame in the video; and generating, based at least on the first dissimilarity metric and the second dissimilarity metric, a playback of the video.

In some variations, one or more of the features disclosed herein including the following features can optionally be included in any feasible combination. The first dissimilarity metric may be determined based on a first similarity metric between the first key frame and the second key frame. The second dissimilarity metric may be determined based on a second similarity metric between the second key frame and the third key frame.

In some variations, the first dissimilarity metric may correspond to the first difference between a first foreground of the first key frame and a second foreground of the second key frame. The second dissimilarity metric may correspond to the second difference between the second foreground of the second key frame and a third foreground of the third key frame.

In some variations, the method may further include: applying a foreground segmentation technique to detect one or more of the first foreground, the second foreground, or the third foreground.

In some variations, the method may further include: binarizing the first foreground, the second foreground, and/or the third foreground such that the first dissimilarity metric is computed based on the binarized first foreground and the binarized second foreground and the second dissimilarity metric is computed based on the binarized second foreground and the binarized third foreground.

In some variations, the playback of the video may include displaying a visual representation of the first dissimilarity metric and the second dissimilarity metric.

In some variations, the playback of the video may include playing the video at a first playback speed corresponding to the first dissimilarity metric and playing the video at a second playback speed corresponding to the second dissimilarity metric.

In another aspect, there is provided a computer program product that includes a non-transitory computer readable storage medium. The non-transitory computer-readable storage medium may include program code that causes operations when executed by at least one data processor. The operations may include: determining a first dissimilarity metric corresponding to a first difference between a first key frame in a video and a second key frame following the first key frame in the video; determining a second dissimilarity metric corresponding to a second difference between the second key frame and a third key frame following the second key frame in the video; and generating, based at least on the first dissimilarity metric and the second dissimilarity metric, a playback of the video.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to video frame analysis for enhanced video browsing, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

The proliferation of mobile devices capable of capturing still images and videos has created a profusion of images and videos available online. Browsing a large volume of videos to locate content of interest may consume excessive time and computing resources, particularly if the videos are being browsed frame-by-frame. Although skipping over portions of a video may reduce the time and computing resources associated with video browsing, doing so indiscriminately may render the outcome of the task imprecise and unreliable. For certain use cases, such as locating content of interest in a surveillance video or a web conference recording, video browsing with an imprecise or unreliable outcome may be unacceptable.

As such, in some example embodiments, a content engine may quantify the content change that is present in successive frames of a video. For example, the content engine may compute, for a first key frame in a video and a second key frame that follows the first key frame in the video, a dissimilarity metric corresponding to a difference between a first foreground of the first key frame and a second foreground of the second key frame. A dissimilarly metric may be computed for each pair of successive key frames in the video. Moreover, the video may be browsed based on the dissimilarity metrics computed for the successive key frames in the video. For instance, the browsing of the video may include skipping over one or more portions of the video in which the key frames have a below-threshold dissimilarity metric.

Figure 1:
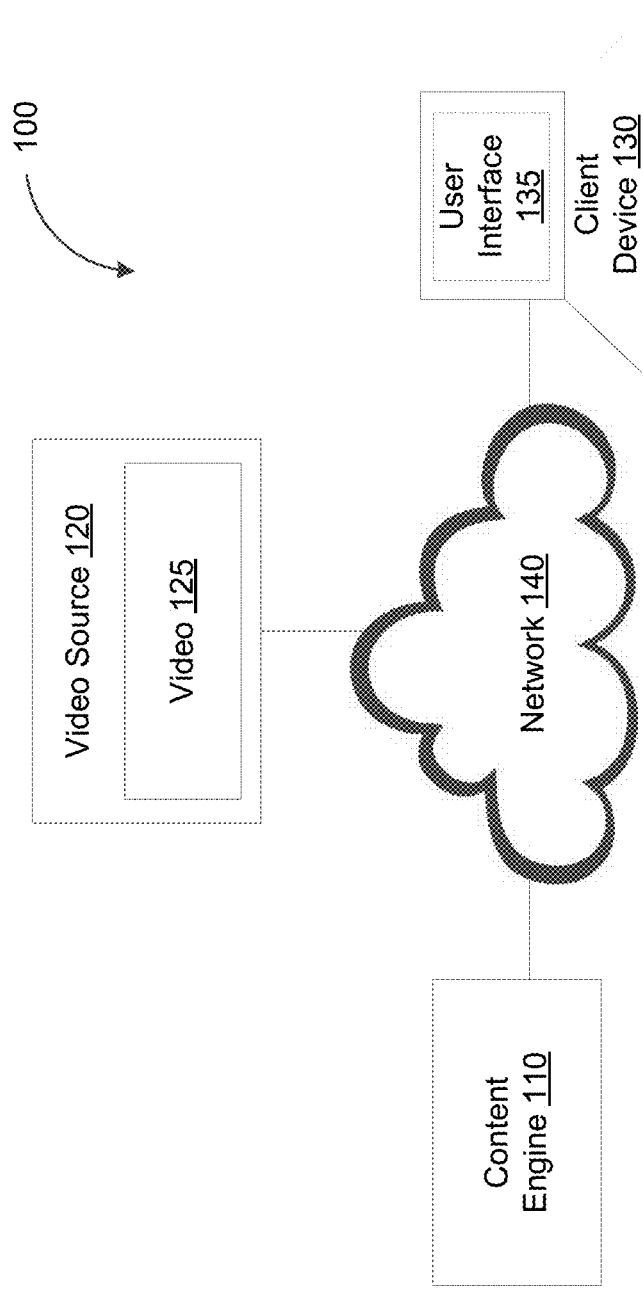
FIG. 1 depicts a system diagram illustrating an example of a video browsing system, in accordance with some example embodiments.

FIG. 1 depicts a system diagram illustrating an example of a video browsing system 100, in accordance with some example embodiments. Referring to FIG. 1, the instrumentation system 100 may include a content engine 110, a video source 120, and a client device 130. As shown in FIG. 1, the content engine 110, the video source 120, and the client device 130 may be communicatively coupled via a network 140. The client device 130 may be a processor-based device including, for example, a smartphone, a tablet computer, a wearable apparatus, a virtual assistant, an Internet-of-Things (IoT) appliance, and/or the like. The network 140 may be any wired and/or wireless network including, for example, a public land mobile network (PLMN), a wide area network (WAN), a local area network (LAN), a virtual local area network (VLAN), the Internet, and/or the like.

In some example embodiments, to enable a targeted browsing of a video 125 from the video source 120, the content engine 110 may quantify the content change that is present in successive frames of the video 125. The video 125 may include a sequence of frames in which on successive pairs of key frames (or intra-frames) are interspersed with one or more inter-frames. As used herein, the term "key frame" refers to a frame for which a complete image is stored in the data stream forming the video 125. Contrastingly, the term "inter-frame" refers to a frame for which only the changes relative to a preceding key frame are stored in the data stream forming the video 125. Encoding the video 125 as successive pairs of key frames interspersed with one or more inter-frames may reduce the redundant data that is present in the data stream and thus serve as a form of video compression. Moreover, a frame analysis that is limited to the key frames of the video 125 but excludes the inter-frames of the video 125 may be less time consuming and more computationally efficient.

As such, according to some example embodiments, the content engine 110 may quantify the content change that is present in successive key frames of the video 125. That is, the content engine 110 may compute a dissimilarly metric for each pair of successive key frames in the video 125. For example, the content engine 110 may compute, for a first key frame in the video 125 and a second key frame that follows the first key frame in the video 125, a first dissimilarity metric corresponding to a difference (or a magnitude of change) between the first key frame and the second key frame. Moreover, the content engine 110 may compute, for the second key frame in the video 125 and a third key frame that follows the second key frame in the video 125, a second dissimilarity metric corresponding to a difference between the second key frame and the third key frame.

In some example embodiments, the frame analysis performed by the content engine 110 may be further limited to the foreground of each key frame. For example, the content engine 110 may apply, to each key frame in the video 125, one or more foreground segmentation techniques in order to identify a first portion of the key frame corresponding to a foreground of the key frame and a second portion of the key frame corresponding to a background of the key frame. The content engine 110 may apply a variety of foreground segmentation techniques, foreground detection techniques, and/or background subtraction techniques including, for example, frame differencing, mean filter, running Gaussian average, background mixture models, subspace learning, robust principal component analysis (RPCA), decomposition into low-rank plus additive matrices, neural networks, and/or the like. Accordingly, the content engine 110 may compute the first dissimilarity metric to correspond to a difference between a first foreground of the first key frame and a second foreground of the second key frame. Alternatively and/or additionally, the content engine 110 may compute the second dissimilarity metric to correspond to a difference between the second foreground of the second key frame and a third foreground of the third key frame.

Figure 2:
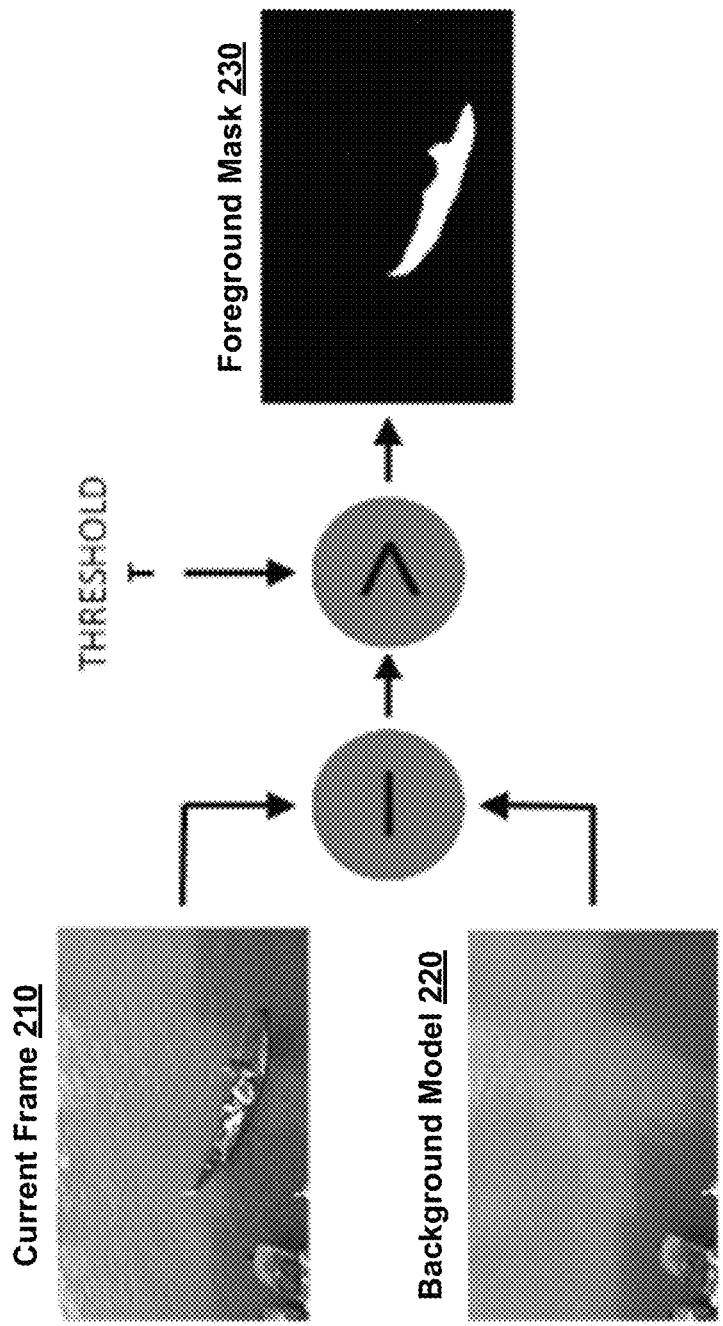
FIG. 2 depicts a schematic diagram illustrating an example of background subtraction, in accordance with some example embodiments.

To further illustrate, FIG. 2 depicts a schematic diagram illustrating an example of background subtraction, in accordance with some example embodiments. As shown in FIG. 2, the content engine 110 may perform background subtraction on a current frame 210 by at least subtracting the pixel values of a background model 220 from the pixel values of the current frame 210. The pixel value of a pixel may describe the brightness and/or color of the pixel. For example, in a grayscale image, each pixel may be associated with a single value representative of the brightness of the pixel (e.g., an 8-bit integer from a range of [0, 255] with 0 corresponding to black and 255 corresponding to white). Alternatively, a color image, each pixel may be associated with a vector of three values corresponding to the intensities of the red, green, and blue components of the pixel. Referring again to FIG. 2, the content engine 110 may generate a foreground mask 230 by applying a threshold T to the difference between the current frame 210 and the background model 220. In the example shown in FIG. 2, the foreground mask 230 may be a binary mask in which each pixel is assigned either a first value (e.g., "0") indicating that the pixel is a part of the background of the current frame 210 or a second value (e.g, "1") indicating that the pixel is a part of the foreground of the current frame 210.

In some example embodiments, upon identifying the foreground of one or more key frames from the video 125, the content engine 110 may further binarize the foreground of the key frames in order to eliminate irrelevant factors, such as changes in the colors and/or brightness of the pixels in the foreground, from affecting the subsequent frame analysis. That is, in computing a dissimilarity metric quantifying the difference between two successive key frames, the content engine 110 may disregard changes in color and/or brightness at least because such factors tend to be irrelevant to the identification of content of interest. Instead, the content engine 110 may compute, based on the binarized foregrounds of two successive key frames, a dissimilarity metric that quantify changes in shape edges and/or boundaries between the two successive key frames.

In some example embodiments, the content engine 110 may compute the dissimilarity metric for two successive key frames in the video 125 based on a similarity metric for the two successive key frames. Examples of similarity metrics include a Minkowski distance, a Manhattan distance, a Euclidean distance, a Hausdorff distance, and/or the like. The similarity metric between a first key frame from the video 125 and a second key frame following the first key frame in the video 125 may be computed based on a first vector of binarized pixel values from the first foreground of the first key frame and a second vector of binarized pixel values from the second foreground of the second key frame. The content engine 110 may then normalize the similarity metric, for example, to a range such as [1, 100], before computing a corresponding dissimilarity metric based on Equation (1) below. It should be appreciated that the higher the dissimilarity metric between the first key frame and the second key frame, the larger the difference between the first key frame and the second key frame.

$$\text{dissimilarity metric} = 100 - \text{similarity metric}$$

Figure 3A:
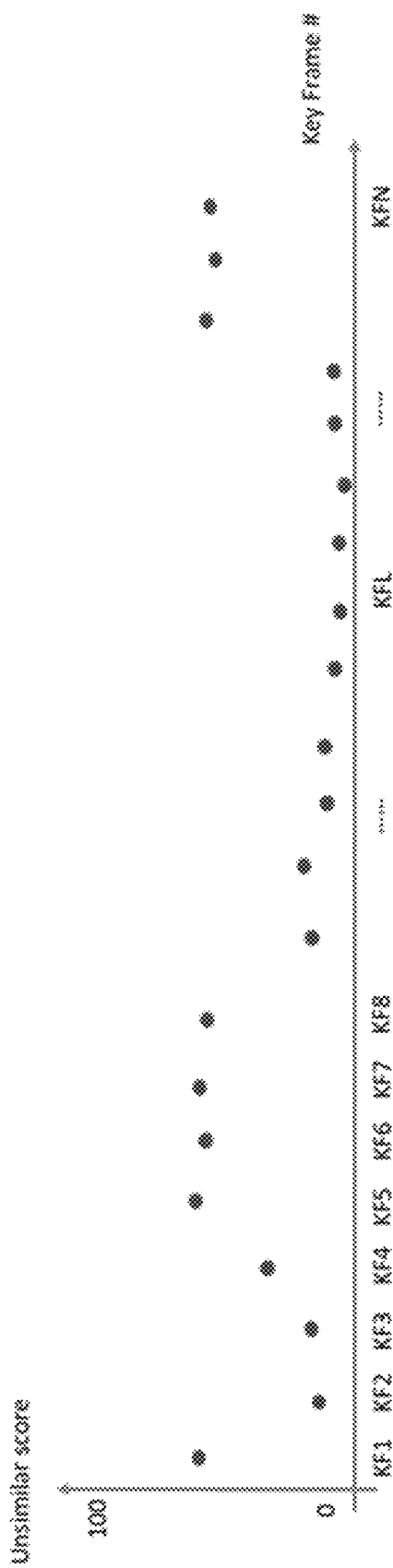
FIG. 3A depicts a graph illustrating an example of the dissimilarity metrics computed for a video, in accordance with some example embodiments.

In some example embodiments, the video 125 may be browsed based on the dissimilarity metrics computed for the successive key frames in the video. For example, as shown in FIG. 3A, each dissimilarity metric computed for the video 125 may be associated with a corresponding key frame number and/or a timestamp. Moreover, in some instances, the video 125 may be displayed with the dissimilarity metrics computed for the video 125 such that the browsing of the video 125 may include skipping over one or more portions of the video 125 in which the key frames have a below-threshold dissimilarity metric.

Figure 3B:
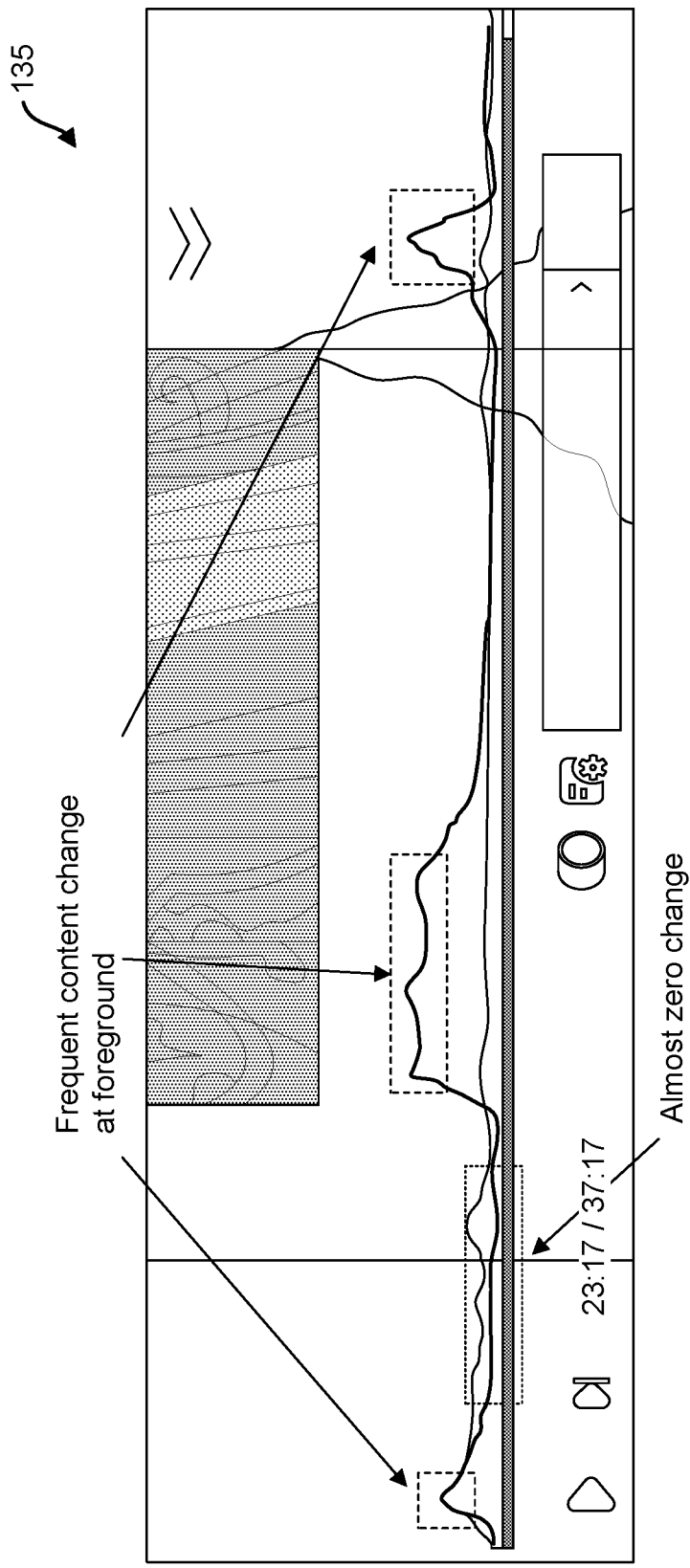
FIG. 3B depicts a screenshot illustrating an example of a user interface for dissimilarity metric based video browsing, in accordance with some example embodiments.

To further illustrate, FIG. 3B depicts a screenshot illustrating an example of a user interface 135 at the client device 130 in which the dissimilarity metrics computed for the video 125 are displayed to enable a targeted browsing of the video 125. In the example shown in FIG. 3B, the user interface 135 may include a graphical representation of the dissimilarity metrics associated with the video 125 (e.g., a line graph, a histogram, and/or the like), thus identifying portions of the video 125 in which key frames are associated with low dissimilarity metrics. Alternatively, the content controller 110 may generate a playback of the video 125 in which the playback speed of the video 125 corresponds to the dissimilarity metrics associated with the video 125. For instance, a first portion of the video 125 in which key frames are associated with an above-threshold dissimilarity metric may be played at a first speed while a second portion of the video 125 in which key frames are associated with a below-threshold dissimilarity metric may be played at a second speed. The second speed may be higher than the first speed in order to abbreviate the quantity of time consumed by the playback of the second portion of the video 125.

Figure 4:
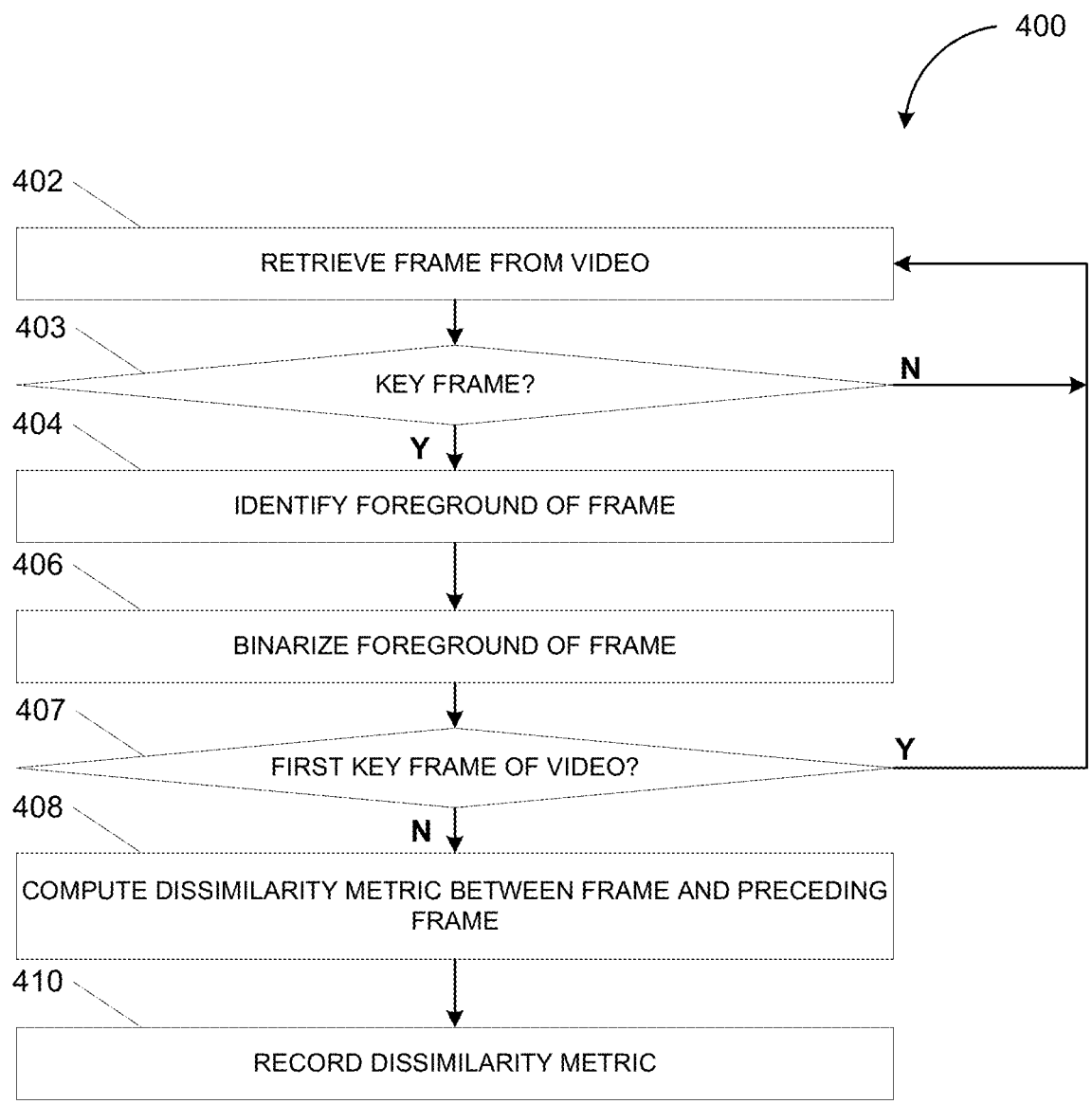
FIG. 4 depicts a flowchart illustrating an example of a process for video frame analysis, in accordance with some example embodiments.

FIG. 4 depicts a flowchart illustrating an example of a process 400 for video frame analysis, in accordance with some example embodiments. Referring to FIGS. 1-2, 3A-B, and 4, the process 400 may be performed by the content controller 110 in order to analyze the frames of the video 125. As the dissimilarity metric is computed for a key frame and its preceding frame, it should be appreciated that the content controller 110 may not perform a portion of the process 400 to compute a dissimilarity metric for the first key frame of the video 125 at least because the first key frame of the video 125 lacks a preceding key frame. Moreover, as noted, the process 400 may be performed for successive key frames of the video 125 and not the intra-frames that are interspersed therebetween.

At 402, the content controller 110 may retrieve a frame from a video. For example, the content controller 110 may perform frame analysis on the video 125. The video 125 may, as noted, include a sequence of frames in which on successive pairs of key frames (or intra-frames) are interspersed with one or more inter-frames.

At 403, the content controller 110 may determine whether the frame is a key frame. The key frames of the video 125 are those frames for which a complete image is stored in the data stream forming the video 125. Contrastingly, the inter-frames interspersed between the key frames are frames for which only the changes relative to a preceding key frame are stored in the data stream forming the video 125. At 403—N, the content controller 110 may determine that the frame is not a key frame. As such, the process 400 may resume at operation 402 and the content controller 110 may retrieve a next frame from the video before determining, at operation 403, whether that next frame is a key frame.

Alternatively, at 403—Y, the content controller 110 may determine that the frame is a key frame. Accordingly, at 404, the content controller 110 may identify a foreground of the frame. In some example embodiments, the content engine 110 may apply, to each key frame in the video 125, one or more foreground segmentation techniques in order to identify a first portion of the key frame corresponding to a foreground of the key frame and a second portion of the key frame corresponding to a background of the key frame. The content engine 110 may apply a variety of foreground segmentation, foreground detection, and/or background subtraction techniques including, for example, frame differencing, mean filter, running Gaussian average, background mixture models, subspace learning, robust principal component analysis (RPCA), decomposition into low-rank plus additive matrices, neural networks, and/or the like. Moreover, at 406, the content controller 110 may binarize the foreground of the frame. As noted, doing so may eliminate irrelevant factors, such as changes in the colors and/or brightness of the pixels in the foreground, from the subsequent computation of a dissimilarity metric.

At 407, the content controller 110 may determine whether the frame is a first key frame in the video. As noted, the content controller 110 may not compute a dissimilarity metric for the first key frame of the video 125 at least because the first key frame of the video 125 lacks a preceding key frame. For example, at 407—Y, the content controller 110 may determine that the frame is the first key frame in the video. Accordingly, the process 400 may resume at operation 402 and the content controller 110 may retrieve a next frame from the video before determining, at operation 403, whether that next frame is a key frame.

Alternatively, at 407—N, the content controller 110 may determine that the frame is not the first key frame in the video. As such, at 408, the content controller 110 may compute a dissimilarity metric between the frame and a preceding key frame in the video. In some example embodiments, the content engine 110 may compute the dissimilarity metric for two successive key frames in the video 125 based on a corresponding similarity metric such as, for example, a Minkowski distance, a Manhattan distance, a Euclidean distance, a Hausdorff distance, and/or the like. The similarity metric between a first key frame from the video 125 and a second key frame following the first key frame in the video 125 may be computed based on a first vector of binarized pixel values from the first foreground of the first key frame and a second vector of binarized pixel values from the second foreground of the second key frame. Moreover, the content engine 110 may first normalize the similarity metric, for example, to a range such as [1, 100], before computing a corresponding dissimilarity metric.

At 410, the content controller 110 may record the dissimilarity metric. For example, each dissimilarity metric computed for the video 125 may be associated with a corresponding key frame number and/or a timestamp. The process 400 may then resume at 402 and the content controller 110 may retrieve a next frame from the video before determining, at operation 403, whether that next frame is a key frame. The content controller 110 may continue performing the process 400 until the content controller 110 reaches a final key frame in the video 125.

In some example embodiments, the dissimilarity metrics computed for the video 125 may enable a targeted browsing of the video 125. For example, as shown in FIG. 3B, a visual representation of the dissimilarity metrics associated with the video 125 (e.g., a line graph, a histogram, and/or the like) may be displayed with the video 125 to identify portions of the video 125 in which key frames are associated with low dissimilarity metrics. Alternatively, the content controller 110 may generate a playback of the video 125 in which the playback speed of the video 125 corresponds to the dissimilarity metrics associated with the video 125. For instance, a first portion of the video 125 in which key frames are associated with an above-threshold dissimilarity metric may be played at a first speed while a second portion of the video 125 in which key frames are associated with a below-threshold dissimilarity metric may be played at a second speed.

Figure 5A:
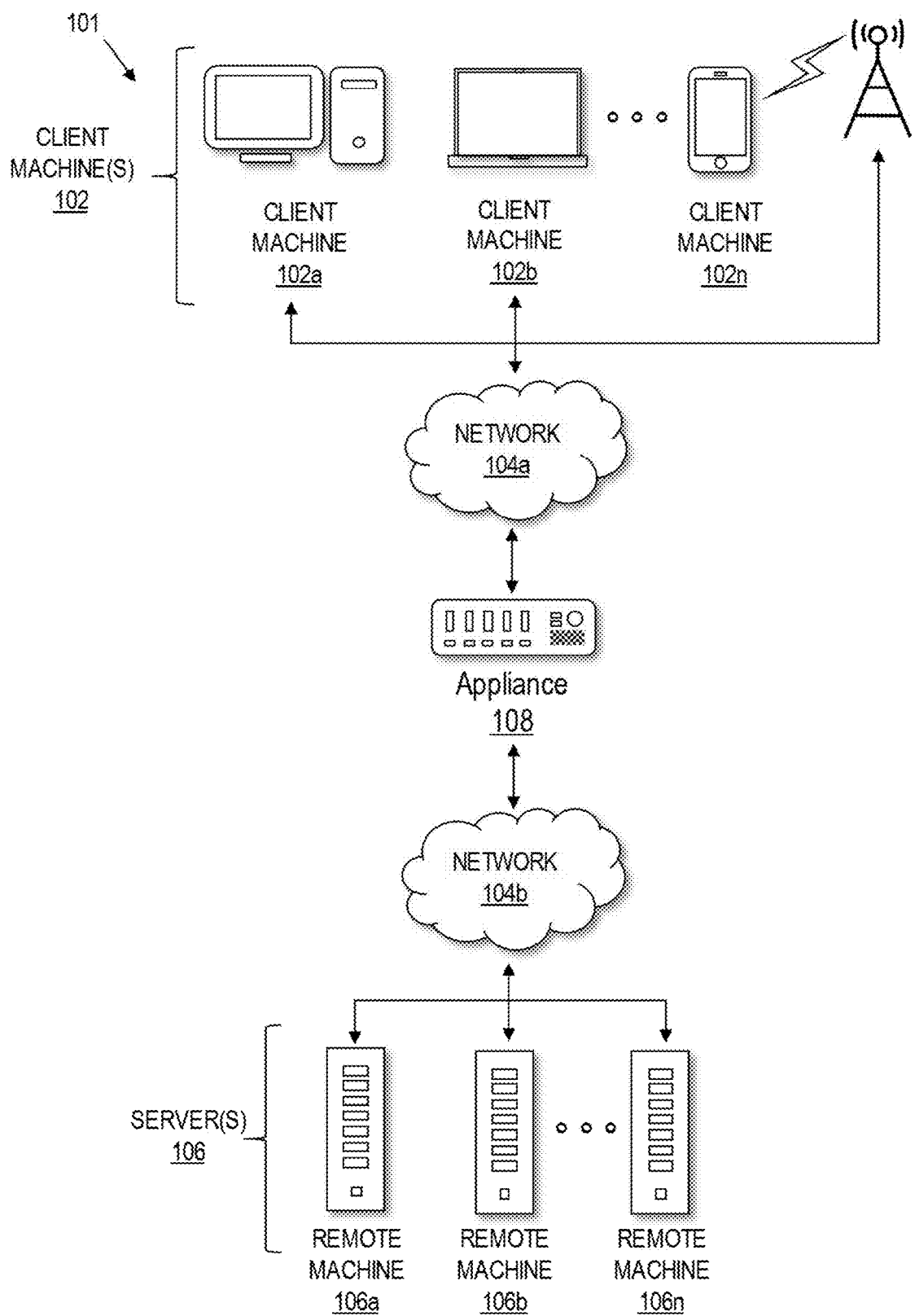
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more client machines 102a-102n, one or more remote machines 106a-106n, one or more networks 104a and 104b, and one or more appliances 108 installed within the network environment 101. The client machines 102a-102n communicate with the remote machines 106a-106n via the networks 104a and 104b.

In some example embodiments, the client machines 102a-102n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The client machines 102a-102n may be generally referred to as client machines, local machines, clients, client nodes, client computers, client devices, computing devices, endpoints, or endpoint nodes. The client machines 102a-102n may include, for example, the client machine 102 and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other client machines 102a-102n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the instrumentation engine 110 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client machine 102.

In yet other example embodiments, a server 106 may execute a virtual machine providing, to a user of a client machine 102, access to a computing environment. The client machine 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
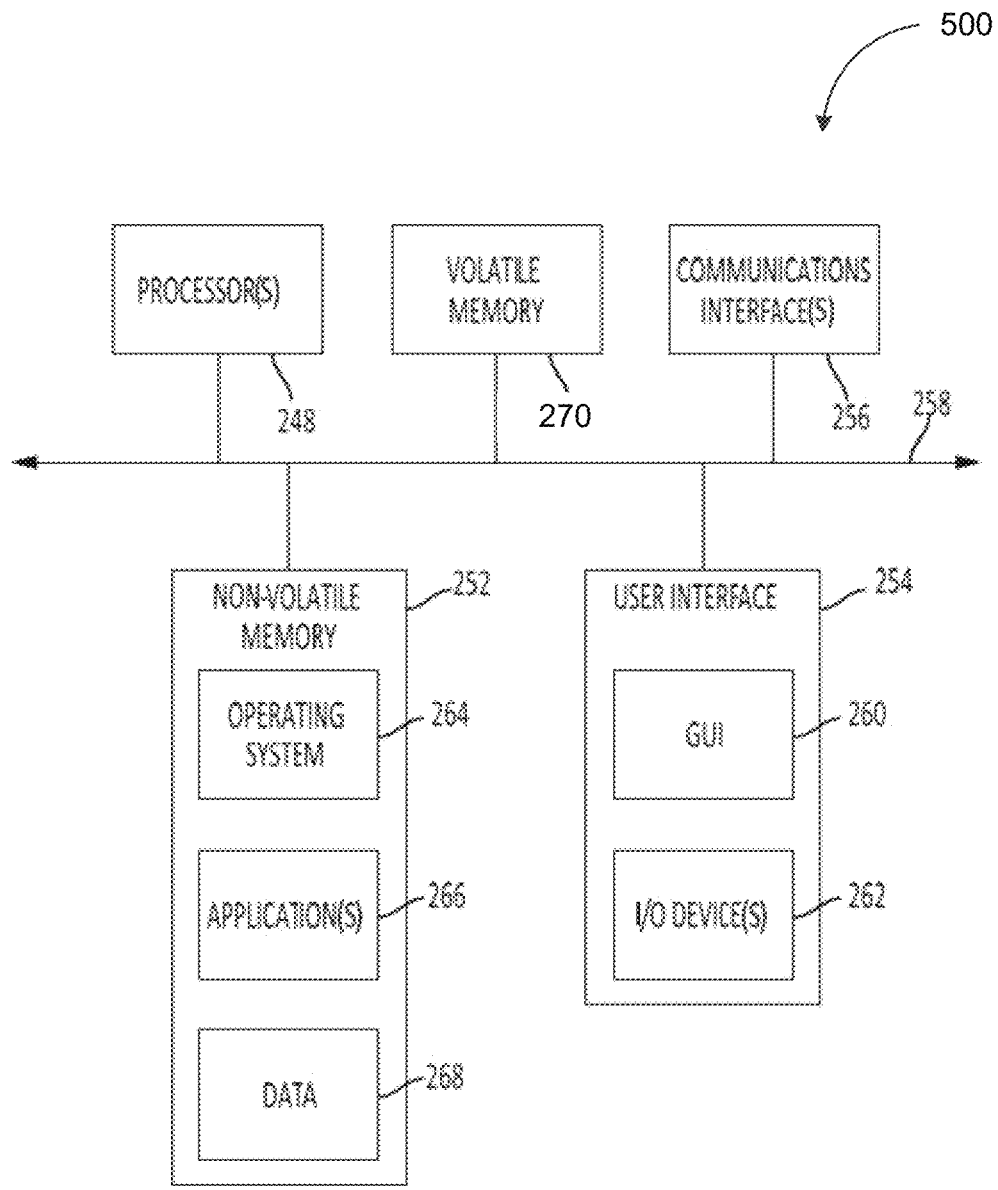
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the first client machine 102a, the second client machine 102b, the third client machine 102c, the fourth client machine 102d, and/or the instrumentation engine 110.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the first client machine 102a, the second client machine 102b, the third client machine 102c, the fourth client machine 102d, and/or the instrumentation engine 110 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
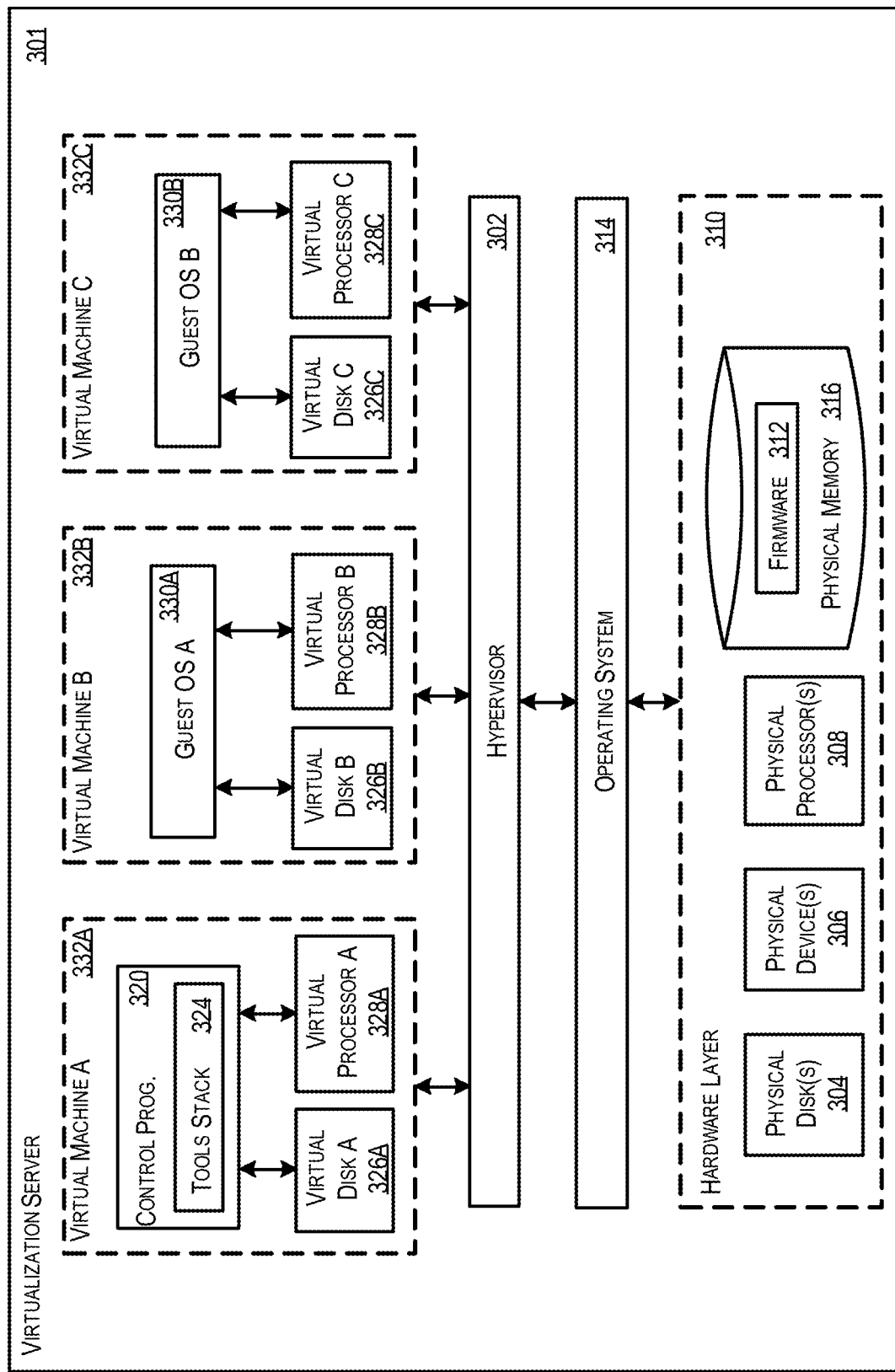
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions, which when executed by the least one data processor, cause the at least one data processor to at least:
        binarize at least a first portion of a first key frame, a second portion of a second key frame, and a third portion of a third key frame in a video;
        determine a first dissimilarity metric corresponding to a first difference between the binarized first portion of the first key frame and the binarized second portion of the second key frame;
        determine a second dissimilarity metric corresponding to a second difference between the binarized second portion of the second key frame and the binarized third portion of the third key frame;
        generate, based at least on the first dissimilarity metric and the second dissimilarity metric, a playback of the video; and
        record the first dissimilarity metric and the second dissimilarity metric, the first dissimilarity metric being associated with the second key frame and/or a first timestamp of the second key frame, and the second dissimilarity metric being associated with the third key frame and/or a second timestamp of the third key frame.

2. The system of claim 1, wherein the first dissimilarity metric is determined based on a first similarity metric between the first key frame and the second key frame, and wherein the second dissimilarity metric is determined based on a second similarity metric between the second key frame and the third key frame.

3. The system of claim 2, wherein the first similarity metric is determined based on a first vector of binarized pixel values.

4. The system of claim 1, wherein the first portion of the first key frame is a first foreground of the first key frame, wherein the second portion of the second key frame is a second foreground of the second key frame, and wherein the third portion of the third key frame is a third foreground of the third key frame.

5. The system of claim 4, wherein the at least one data processor is further caused to at least:
    apply a foreground segmentation technique to detect one or more of the first foreground, the second foreground, or the third foreground.

6. The system of claim 5, wherein the foreground segmentation technique comprises one or more of a frame differencing, a mean filter, a running Gaussian average, a background mixture model, a subspace learning, a robust principal component analysis (RPCA), a decomposition into low-rank plus additive matrices, or a neural network.

7. The system of claim 1, wherein the at least one data processor is further caused to at least determine the first dissimilarity metric to quantify changes in shape edges between the first key frame and the second key frame.

8. The system of claim 1, wherein the playback of the video includes displaying a visual representation of the first dissimilarity metric and the second dissimilarity metric.

9. The system of claim 1, wherein the playback of the video includes playing the video at a first playback speed corresponding to the first dissimilarity metric and playing the video at a second playback speed corresponding to the second dissimilarity metric.

10. The system of claim 1, wherein the playback of the video skips over one or more key frames associated with a below-threshold dissimilarity metric.

11. The system of claim 1, wherein the at least one data processor is further caused to at least:
    identify the first key frame, the second key frame, and the third key frame such that a dissimilarity metric is computed for each pair of key frames included in the video but not for one or more inter-frames interspersed between successive key frames.

12. A computer-implemented method, comprising:
    binarizing at least a first portion of a first key frame, a second portion of a second key frame, and a third portion of a third key frame in a video;
    determining a first dissimilarity metric corresponding to a first difference between the binarized first portion of the first key frame and the binarized second portion of the second key frame;
    determining a second dissimilarity metric corresponding to a second difference between the binarized second portion of the second key frame and the binarized third portion of the third key frame;
    generating, based at least on the first dissimilarity metric and the second dissimilarity metric, a playback of the video; and
    recording the first dissimilarity metric and the second dissimilarity metric, the first dissimilarity metric being associated with the second key frame and/or a first timestamp of the second key frame, and the second dissimilarity metric being associated with the third key frame and/or a second timestamp of the third key frame.

13. The method of claim 12, wherein the first dissimilarity metric is determined based on a first similarity metric between the first key frame and the second key frame, and wherein the second dissimilarity metric is determined based on a second similarity metric between the second key frame and the third key frame.

14. The method of claim 12, wherein the first portion of the first key frame is a first foreground of the first key frame, wherein the second portion of the second key frame is a second foreground of the second key frame, and wherein the third portion of the third key frame is a third foreground of the third key frame.

15. The method of claim 14, further comprising:
applying a foreground segmentation technique to detect one or more of the first foreground, the second foreground, or the third foreground.

16. The method of claim 14, further comprising determining the first dissimilarity metric to quantify changes in shape edges between the first key frame and the second key frame.

17. The method of claim 12, wherein the playback of the video includes displaying a visual representation of the first dissimilarity metric and the second dissimilarity metric.

18. The method of claim 12, wherein the playback of the video includes playing the video at a first playback speed corresponding to the first dissimilarity metric and playing the video at a second playback speed corresponding to the second dissimilarity metric.

19. A non-transitory computer readable medium storing instructions, which when executed by at least one data processor, result in operations comprising:
binarizing at least a first portion of a first key frame, a second portion of a second key frame, and a third portion of a third key frame in a video;
determining a first dissimilarity metric corresponding to a first difference between the binarized first portion of the first key frame and the binarized second portion of the second key frame;
determining a second dissimilarity metric corresponding to a second difference between the binarized second portion of the second key frame and the binarized third portion of the third key frame;
generating, based at least on the first dissimilarity metric and the second dissimilarity metric, a playback of the video; and
identifying the first key frame, the second key frame, and the third key frame such that a dissimilarity metric is computed for each pair of key frames included in the video but not for one or more inter-frames interspersed between successive key frames.

20. A computer-implemented method, comprising:
binarizing at least a first portion of a first key frame, a second portion of a second key frame, and a third portion of a third key frame in a video;
determining a first dissimilarity metric corresponding to a first difference between the binarized first portion of the first key frame and the binarized second portion of the second key frame;
determining a second dissimilarity metric corresponding to a second difference between the binarized second portion of the second key frame and the binarized third portion of the third key frame;
generating, based at least on the first dissimilarity metric and the second dissimilarity metric, a playback of the video; and
identifying the first key frame, the second key frame, and the third key frame such that a dissimilarity metric is computed for each pair of key frames included in the video but not for one or more inter-frames interspersed between successive key frames.

* * * * *